Jan. 7, 1964     H. H. MALONE     3,116,941
TIME CARD BLOTTER

Filed Dec. 10, 1959     2 Sheets-Sheet 1

INVENTOR
HAROLD H. MALONE

BY *John H. Widdowson*

ATTORNEY

Jan. 7, 1964  H. H. MALONE  3,116,941
TIME CARD BLOTTER
Filed Dec. 10, 1959  2 Sheets-Sheet 2
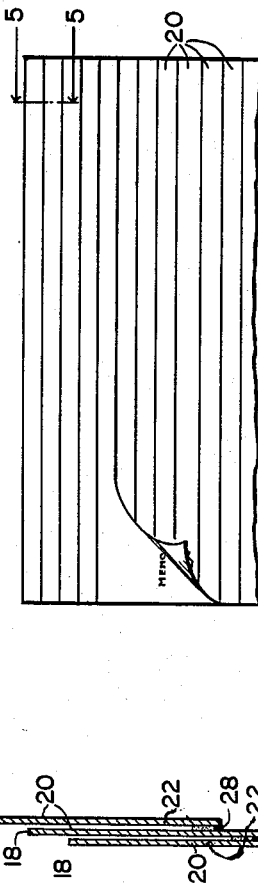
FIG. 6
FIG. 7
FIG. 4
FIG. 5
INVENTOR
HAROLD H. MALONE
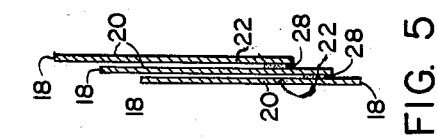
ATTORNEY : 3,116,941
TIME CARD BLOTTER
Harold H. Malone, Bitting Bldg., Wichita, Kans.
Filed Dec. 10, 1959, Ser. No. 858,716
5 Claims. (Cl. 282—23)

This invention relates to a new construction for a business form, and in particular to a time card blotter particularly adapted for use by attorneys.

Business forms heretofore available to the public have failed to provide a construction which was suitable for detailed keeping of time records. This is particularly true where the form was being maintained by the self-employed, an attorney or other such person whose time is their stock in trade. The prior art provided no means for detaching and reassembling together separate transactions related to the same account or subject matter.

In accordance with the present invention a novel construction has been provided for a business form which is readily adapted to a time card for keeping accurate and detailed records of time spent on any number of projects with a minimum of time and effort expended on the records. In general, this is accomplished by providing duplicate records on two detachably assembled leaves, one copy of which is divided into sections or sheets by rows of perforations for easy subdivision, and which can then be easily joined to sections of like construction by use of an adhesive on the back surface thereof, for use in ledgers or files of individual accounts.

Accordingly, it is an object of this invention to provide a new and improved construction for business forms.

Another object of this invention is to provide a new and improved business form particularly adapted to keeping time records.

A still further object of this invention is to provide a new and improved time card particularly adapted to keeping time records for the self-employed, or attorneys or the like.

Another object of the invention is to provide a new construction for a business form whereby it can be disassembled into sections or sheets for subsequent joining to similar sections or sheets.

Various other objects, advantages and features of the invention will become apparent from the following description taken in connection with the accompanying drawings.

Drawings accompany and are a part of this disclosure. The drawings depict a preferred specific embodiment of the new form of my invention and it is understood that such drawings are not to unduly limit the scope of my invention.

In the drawings,

FIG. 4 shows another of the preferred methods of joining the individual detached sections.

FIG. 5 is a cross section taken along the line 5—5 of FIG. 4.

FIG. 6 illustrates in detail a portion of the top leaf of FIG. 1, including one of the detachable sections with an example of the printed matter which can be placed thereon to facilitate the keeping of time records.

FIG. 7 shows the detachable stub extending across the lower portion of the leaves.

Figure 1:
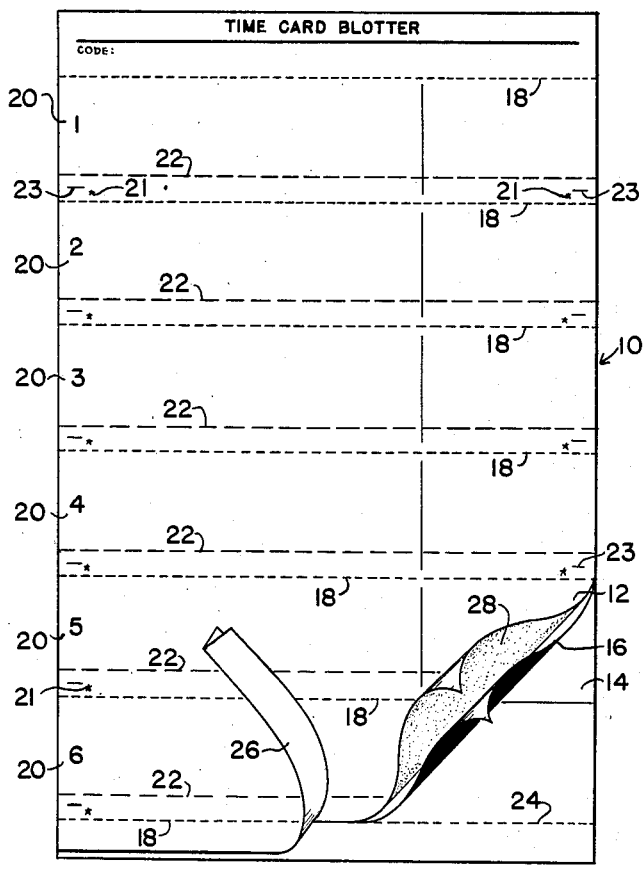
FIG. 1 is a plan view of a preferred embodiment of my invention with the attaching stub partially removed showing the relation of the individual leaves.

Referring now to the drawings in detail, FIG. 1 shows a preferred specific embodiment of a time card blotter 10 which includes a top record leaf 12, a lower record leaf 14, and a transfer or carbon leaf 16 therebetween. The top leaf 12 has a plurality of rows of perforations 18 extending transversely across the entire sheet. The rows of perforations 18 are preferably parallel to the top and bottom of the leaf, and are also parallel to and equally spaced from each other, thereby forming a number of like record sections, segments or sheets 20. Each record section, segment or sheet 20 can have a weakened bend line 22 extending transversely across the leaf 12. The weakened bend lines 22 are preferably parallel to the rows of perforations 18, are spaced slightly therefrom, and when used, facilitate inspection of the individual sections 20 when they have been joined as explained hereinafter. In the preferred embodiment disclosed, the weakened bend line 22 is near the lower edge of each section 20, however, this location may be varied as desired to fit any particular application.

Suitable printed material can be placed on each section 20 to facilitate the use of the form in its intended application. A specific example of such a form has been set forth below in connection with FIG. 6. For the present, it is sufficient to indicate that the same printed matter will be on each of the sections 20, and on the underlying portions of leaf 14.

Leaf 14, while preferably containing the same printed matter as leaf 12, is altogether different in construction. Leaf 14 has only one row of transverse perforations shown at 24 in FIG. 1. The row of perforations 24 extends transversely across the entire width of leaf 14, and is spaced from the lower end of leaf 14 by a distance equal to the spacing of the lowermost row of perforations 18 on leaf 12. If desired, suitable aperture or apertures (not shown) can be formed along one edge of leaf 14 to facilitate their insertion and retention by binder rings in the common manner.

Transfer or carbon leaf 16, in the preferred embodiment, is void of perforations or weakened fold lines therein. The leaf 16 can be of common carbon paper or any other material which will transfer the handwriting from an overlying sheet to that of an underlying sheet. As will be apparent to those skilled in the art, so called two-way carbons can be used which transfers the writing to the adjacent face of sheets on both sides of the transfer leaf; thereby making an additional record copy without using an additional carbon leaf.

The lower portions of each leaf is secured to the adjacent leaf by blue or any suitable adhesive between the lowest perforation on each record leaf and the lower edge of the leaves to form a stub 26. The stub 26 serves to hold the various leaves in their assembled position while the various sections or sheets 20 are being completed. The individual leaves 12, 14 and 16 can be separated by tearing the stub 26 along the rows of perforations 18 and 24. Stub 26 and transfer leaf 16 are removed together and then disposed of. Leaf 14 in its present form, constitutes a permanent master copy of all transactions in consecutive order, and can be filed in a daily log book, as desired. The leaves assembled in this manner constitute a sheaf. A plurality of these sheaves can be arranged together in pad or book form to be easily marketed.

Leaf 12 can then be divided into the individual sections or sheets 20 by tearing along perforations 18. The individual record sections or sheets 20 can then be joined to like constructed sections of proper subject matter thereby allowing the different sections or sheets 20 related to the same subject matter, to be filed together. Assembling the individual sections 20 is quickly and easily done by merely moistening the adhesive 28 which covers the entire back face of leaf 12 and pressing the section 20 onto the desired surface. While the moistenable adhesive 28 usually covers the entire back face of leaf 12 for convenience, it is only necessary that the sections 20, or a portion thereof, be covered. An adhesive could be selectively applied to the back of sections 20 when they are assembled with others.

Figure 2:
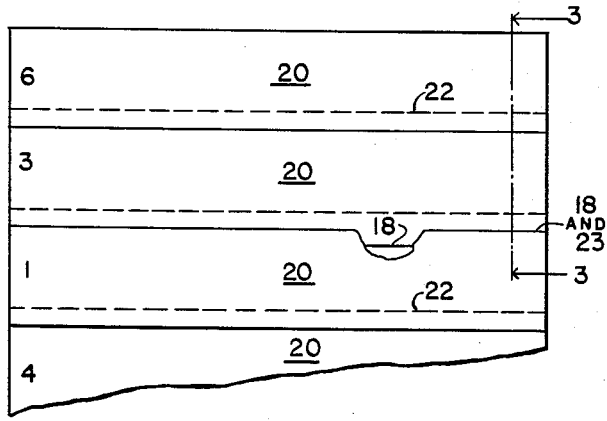
FIG. 2 shows in plan view the individual sections of a top leaf joined with sections of like construction in one of the preferred methods of the invention.
Figure 3:
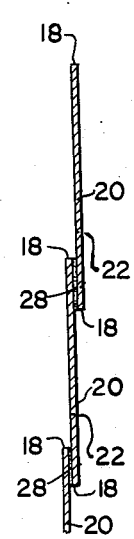
FIG. 3 is a section taken along the line 3—3 of FIG. 2 looking in the direction of the arrows.

One of the preferred forms of joining the individual sections is shown in FIGS. 2 and 3. Here the back side of each section or sheet 20 is moistened along its upper edge and pressed onto the lower front face of another section 20, and overlaps it up to the stared line 21 (FIGS. 1, 6 and 7), approximately up to markings 23. When a plurality of sections 20 are assembled in this manner a full record of the transactions relating to one subject matter will be readily visible to the viewer. Obviously, where this method of joining is utilized, the portion of each section 20 from the stared line to the adjacent row of perforations 18, which is covered by another section 20, should contain no subject matter important to the transaction. While the above described manner of joining is entirely adequate to secure the sections 20 relative to each other, they can in addition, be secured to an additional backing leaf, to the flap of a file wrapper, or to any article to which the adhesive 28 can be secured. The weakened fold line 22 is not essential here and can be dispensed with where this method of joining is used.

A plurality of sheets joined in this manner can be secured in book form by additionally moistening one edge of each section 20 and pressing it onto another sheet so joined. This can also be done as the individual sections 20 are joined.

In FIGS. 4 and 5 another of the preferred assemblies of sections 20 are shown. In this method of joining, a strip across the back side of section 20 is moistened below weakened fold line 22, along stared line 21. The width of the section moistened is preferably no wider than the portion of section 20 from the line of the markings 23 to the perforation 18. The section or sheet 20, moistened in this manner, is placed over another section 20 with the moistened section overlying the portion of the second section 20 between the lines 18 and 23 along line 21, and is pressed into sealing contact therewith. The plurality of sections 20 joined in this manner form the shingle type arrangement shown in FIG. 4 and FIG. 5. Here, as in the assembly previously described, it is desirable that no information relative to the transaction be present in that portion of each section 20 between the line 23 and the row of perforation 18. In the present manner of assembly, the top edge of each section 20 will be visible and can contain identifying information regarding the transaction on each section. If desired, the sections 20 joined in this manner can also be secured to an additional leaf, a file wrapper, or other suitable backing means, however the sections thus assembled have sufficient rigidity to be used in most cases without the additional backing means. When thus joined, any particular transaction can be readily located by the identifying information on the exposed portion of section 20. By providing the sections 20 with the weakened fold line 22, a transaction thus located can be consulted by folding the section 20 along the weakened fold line 22. Thus a large number of sections 20 can be arranged in a small space and still be readily located and observed. By providing weakened fold line 22 on each section 20, creases and folds which might otherwise mutilate the body of the transaction on each section will be eliminated.

Other methods of joining the detached sections 20 will be apparent to one skilled in the art. For example, they can be secured along the edges, either directly over one another or staggered. Also the preferred methods previously described can be reversed to expose the opposite edge of each section 20.

As previously indicated, one of the preferred applications of the present novel construction of this invention is for a time card blotter for an attorney or other self-employed person. An example of the printed material which can be placed on the form is indicated in FIG. 6.

The portion of the time card blotter above the upper perforation 18 can be used to set forth a standard office code for frequently used words or symbols when filling in the blanks of the individual sections. On the first line of the section 20 as illustrated, the user places his initials or an identifying symbol, the date, the name of the client, and the subject involved. On the next line the day of the week, address and telephone number of the client is indicated. On the third and remaining lines on the left hand side of the form, space is provided for memorandums describing the work which should be noted at the time the work is done. The individual sections or sheets 20 are numbered 1, 2, etc. from the top of the leaf to the bottom. The number of each section or sheet 20 together with the date and identifying initials of the user, provides a cross index to the leaf 14 which shows the individual transactions in consecutive order, and which is normally separately filed. Additional sections 20, involving related projects, can also be referred to on the memorandum lines in this manner.

On the right hand side of the form illustrated, provision is made for computing the time spent on the project. Since the work is often interrupted by telephone calls, office consultations, etc., a plurality of start and stop spaces are provided. The time of starting is placed below the time stopped to facilitate computation of total time involved. It is recommended that the bottom pair of start stop spaces be used first, and then the pair immediately above, etc. until the project is completed. Space is provided to the right of the previously mentioned spaces to indicate the sub-totals of hours and minutes spent on each project. These sub-totals can then be added together and the total time indicated in the space provided. The column headed "ALT." can be used to indicate the time to the nearest tenth of an hour, as an alternate computation, as is the practice in many law offices and business firms. The notes column can be used to indicate information of a particular service performed as explained under the memorandum section of the form. Code letters, as explained on the top of the time card blotter, can also be placed in the notes column. Also on the right hand side of the form, provision is made to indicate the charge for the service, the amount paid, balance due, expenses incurred, and the total. Under "TICKLER DATE" the date the matter again requires attention can be indicated. A check mark in the "more" box can be used to indicate additional data written on another section 20. Suitable indicia, such as the star line 21 below the weakened bend lines 22, or the short lines 23 in the margins adjacent the stars 21 and at the ends of the first line of printing can be provided to serve as guide lines in joining the individual sections, as set forth hereinbefore.

A separate section 20 should be maintained for each client and matter worked on during the day. If service is performed outside the office, a section of the time card blotter should be completed immediately upon returning. If a complete record of the day's work is desired, a separate section can be maintained for non-productive time, and indicated by appropriate comments in the title of the section. The memorandum part of this section can indicate how the unproductive time is spent.

Thus it will be readily apparent from the foregoing description that a complete record of all time in the working day can be easily maintained by an individual without complicated accounting records. By detaching the individual sections 20, and reassembling those pertaining to a particular project or client together, periodic statements can be rendered with a minimum of time and effort. A daily log can be maintained by filing leaves 14 together in a ring binder or other similar holder.

In FIG. 7 the stub 26 of the time card blotter is illustrated. The stub 26 can be utilized for instructions regarding the use of the time card blotter. As previously indicated, the ends of the three leaves are secured together along the lower edge of stub portion 26 to retain the proper relation of the forms during use, and can then be detached by tearing along perforations 18 and 24. The stub portion 26 and transfer leaf 16 are thus separated from leaves 12 and 14 and can be disposed of.

While the time card blotter previously described has particular application in an attorney's office, or other self-employed person, it will be apparent that many modifications and changes can be made in the printed matter thereon to adapt the particular instruction for many different uses. The construction as described could readily be adapted for use by accountants, doctors, architects, dentists, hospitals, etc., who have clients and/or patients. The form could also be used to indicate incoming merchandise in which case the detachable sections 20 would be rearranged and joined to provide a continuous record of receipts of any particular type of merchandise. The duplicate leaf 14 would again be retained as a permanent daily record of receipts in the receiving room. In the latter case, the particular methods of joining as shown in FIGS. 2, 3, 4 and 5 would provide a continuous record of receipts in each item of the inventory. The construction disclosed could also be made for use as a pocket secretary outside the office. More than one of the leaves 12 and/or 14 can be used in a set or sheave if necessary, or the leaf 12 can be used alone in some applications. A plurality of sets or sheaves can be placed in overlying relation and formed into a book or pad, such as by coating an edge with a suitable adhesive. When used in pad or book form, the cover of the pad or other material should be inserted between the sets or sheaves to prevent underlying sets from being written through.

While the invention has been described in connection with preferred embodiments thereof, it will be understood that this description is intended to illustrate and not limit the scope of the invention, which is defined by the appended claims.

As will be evident to those skilled in the art, various modifications of this invention can be made, or followed, in the light of this disclosure and discussion without departing from the scope thereof or from the scope of the claims.

I claim:

1. A time card blotter comprising, in combination, a plurality of superimposed record leaves arranged in pairs, the top leaf in each pair constituting a file copy and the lower leaf in each group constituting a master copy, each of said leaves having printed matter for record keeping extending transversely across said leaves, said printed matter being repeated at equally spaced intervals a plurality of times from the upper to the lower portion of said leaves, the record keeping printed matter on said top leaf of each pair overlying duplicate printed matter on said lower leaf of each pair, parallel rows of perforations extending transversely across the entire width of said top leaf adjacent the upper and lower extremities of said printed matter, other parallel and transversely extending spaced rows of perforations across the entire width of said top leaf defining more than two attached and separable record sections of the same size having a plurality of vertically spaced record entry spaces and each having the same printed matter thereon, said top leaf having weakened bend lines extending transversely across the entire width of said top leaf, one of said bend lines extending along the lower portion of each of said record sections and parallel to said rows of perforations thereon to thereby define a flap portion, a moistenable adhesive coating covering the entire back face of said top leaf in the portion having said record sections, said lower leaf in each pair having only one row of perforations extending transversely thereacross, said last-named row of perforations being adjacent and parallel to the lower edge of said lower leaf and underlying the lower-most row of perforations on said upper leaf, and said leaves being only perforated transversely, a transfer leaf between the record leaves of each pair of record leaves, and guide lines printed on said record sections for joining same to other record sections of the same construction in overlapping relation, said pair of record leaves and said transfer leaf being secured together at the upper end portion above the uppermost row of perforations and at the lower end portion below the lower-most row of perforations thereby providing a record sheaf, said individual sections of said top leaf in each pair being detachable and joinable together in overlapping vertical relation to form a sheet the same width as said top leaf.

2. A business form comprising, in combination, a pair of superimposed leaves, the top leaf of said pair being divided into more than two attached and separable sections of substantially the same size by transverse rows of perforations, one of said rows of perforations being near the lower edge thereof, the lower of said pair of leaves having only one row of perforations thereacross positioned along the lower edge thereof and spaced therefrom in the same manner as the row of perforations along the lower edge of said top leaf, and said leaves being only perforated transversely, a transfer leaf interposed between said pair of leaves, means removably securing said pair of leaves and said transfer leaf in assembled relation, said leaves being separable by tearing along the lower row of perforations of said top leaf and said row of perforations on said lower leaf, said sections of said top leaf having an adhesive on the back surface thereof and being individually detachable along said rows of perforations for subsequent joining to sections of the same or similar structure by said adhesive, said adhesive being in position and present in an amount so that the individual sections can be joined together therewith in overlapping and vertical relation to form a sheet the same width as said leaves.

3. The form as recited in claim 2 wherein said adhesive on said back surface of said sections of said top leaf is positioned and present in an amount along the upper edge portion of said sections and attachable to the lower edge portion of the front surface of another of said sections to form a leaf approximately the size of said top leaf.

4. The form as recited in claim 2 wherein said adhesive on said back surface of said sections of said top leaf is positioned and present in an amount along the lower edge portion of said sections so that said sections can be joined together in vertical and substantially complete overlapping relation, and each of said sections having a transverse weakened bend line along the lower edge thereof adjacent and parallel to said rows of perforations providing sections which can be bent along said bend line to permit viewing of a section thereunder.

5. A business form for keeping client or customer information comprising, in combination, a pair of superimposed leaves, the top leaf of said pair of leaves being divided into more than two attached and separable sections of substantially the same size by transverse rows of perforations with one dimension of said sections being the same as the width of said leaf, each of said sections having lines printed thereon dividing said sections into spaces for record keeping and having informational printing thereon relative said spaces indicating space for recording client or customer information, said top leaf being perforated only transversely, transfer means positioned between said pair of leaves, means removably securing said pair of leaves and said transfer means in assembled relation, said sections of said top leaf having an adhesive on the back surface thereof adjacent said rows of perforations and along said one dimension of said sections and being individually detachable along said rows of perforations for subsequent joining to sections of the same or similar structure by said adhesive, said adhesive being in position and present in an amount so that the individual sections can be joined together in self-supporting relation with a portion of the adhesive between the sections and with the sections in overlapping and vertical relation to form a sheet the same width as said leaves.

(References on following page)

References Cited in the file of this patent

UNITED STATES PATENTS

| | | |
|---|---|---|
| 1,318,163 | Lubin | Oct. 7, 1919 |
| 1,512,685 | Groby | Oct. 21, 1924 |
| 1,979,283 | Osborn | Nov. 6, 1934 |
| 2,085,826 | O'Brien | July 6, 1937 |
| 2,262,277 | Godley | Nov. 11, 1941 |
| 2,262,278 | Godley | Nov. 11, 1941 |
| 2,262,296 | Oettinger | Nov. 11, 1941 |

FOREIGN PATENTS

| | | |
|---|---|---|
| 491,555 | Great Britain | Sept. 5, 1938 |

OTHER REFERENCES

German appl. J9792 printed June 21, 1956 (K1 15*i* 4).